United States Patent [19]

Jenison

[11] Patent Number: 5,402,181

[45] Date of Patent: Mar. 28, 1995

[54] METHOD AND APPARATUS UTILIZING LOOK-UP TABLES FOR COLOR GRAPHICS IN THE DIGITAL COMPOSITE VIDEO DOMAIN

[76] Inventor: Timothy P. Jenison, 6237 SW. 23rd St., Topeka, Kans. 66614

[21] Appl. No.: 678,669

[22] Filed: Apr. 1, 1991

[51] Int. Cl.6 .............................................. H04N 9/74
[52] U.S. Cl. ..................................... 348/651; 348/654; 345/199
[58] Field of Search ...................... 358/22, 27, 28, 10, 358/80, 21 R, 17, 19, 183, 149, 160; H04N 9/74; 340/703

[56] References Cited

U.S. PATENT DOCUMENTS

| | | | |
|---|---|---|---|
| 4,763,186 | 8/1988 | Belmares-Sarabia et al. | 358/27 |
| 4,799,053 | 1/1989 | Van Aken et al. | 340/703 |
| 4,951,126 | 8/1990 | Ohta | 358/22 |
| 5,040,128 | 8/1991 | Yamaguchi | 340/703 |
| 5,042,078 | 8/1991 | Oshikoshi et al. | 358/80 |
| 5,065,230 | 11/1991 | Kumano et al. | 358/19 |

*Primary Examiner*—Mark R. Powell
*Assistant Examiner*—Jeffrey S. Murrell
*Attorney, Agent, or Firm*—Bruce J. Clark

[57] ABSTRACT

In a composite video system having a digitized composite video signal to be modified, wherein the digitized video signal has discrete values having sampling frequency $Nf_s$ where N is an integer greater than one, and $f_s$ is the color subcarrier frequency of the video input signal, a method and apparatus for utilizing look-up tables to create special color effects without decoding to luminance and chrominance, the method having the steps of storing in memory N sets of predetermined values such that the sets are addressable in a desired predetermined order and such that the predetermined values relate to a discrete equal distant points on a color subcarrier frequency wave corresponding to a desired color, retrieving from memory the stored values at a rate $Nf_s$ such that the N sets are addressed in the predetermined order, and using the digitized composite video signal to address said memory, to produce a digitized video output signal with different values, as desired.

14 Claims, 4 Drawing Sheets

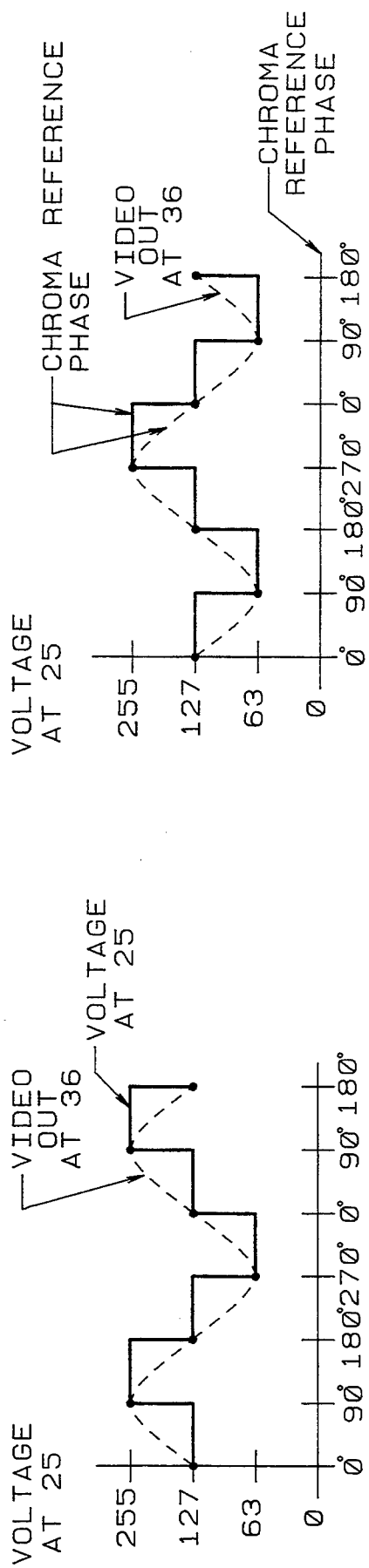

METHOD AND APPARATUS UTILIZING LOOK-UP TABLES FOR COLOR GRAPHICS IN THE DIGITAL COMPOSITE VIDEO DOMAIN

BACKGROUND OF THE INVENTION

In a video special effects system it is usually desired as a special effect to modify some or all of the colors in the image. For example, an effect called "solarization" sometimes referred to as "false color", causes the darkest parts of the image to be displayed as a particular color, e.g. blue, and the brightest parts of the image to be displayed as a different color, e.g. orange. Various shades in between would be converted to the color range between blue and orange, in this example; or perhaps a third color would be substituted somewhere in the range.

Another example of an effect which modifies color is "posterization". In this effect, the original image, which may contain thousands of shades, is represented using a very few discrete colors. For example, an image of a face could be displayed using only black, orange, and white. The resulting image would be recognizable, but would have a high-contrast cut-out look.

Other examples of color modification would include negative color effects, brightness and contrast changes, or overall color tints, on either all or selected parts of the image.

In computer graphics systems using CRT monitors accepting the color components red, green and blue (hereafter R, G, and B) these components can be produced individually by reference to three Look-Up Tables (hereafter "LUT"s), either in hardware memory or in software, using the numerical image data from a display memory to access predetermined values in the R, G and B tables. In the case of a hardware-based LUT system, the numerical values from the display memory are used as addresses to a second memory device in which the lookup values have been previously stored. The data output from this second memory device then becomes the new, modified pixel value. The image is processed in a serial fashion generally starting at the top left of the image, performing the lookup function on each pixel successively, until the entire image has been modified. The resulting R, G and B data streams may be stored in another memory device, or connected to three digital to analog converters to produce three varying voltages to be connected to a component (RGB) color video monitor.

In some computer graphics systems, identical data is routed to all three LUTs. For example, consider an 8 bit display memory which is capable of representing 256 unique values. The 8 bit data stream would be routed to all three LUTs. By properly loading values into the tables in advance, the programmer can specify which colors, or mixtures of R, G, and B, each numerical value will produce. In such a system, only 768 bytes of memory are required. Because only 8 bits of pixel data are supplied, there are only 256 bytes in each table.

A straightforward application of the LUT technique to video special effects would involve decoding the composite video signal from a camera or video recorder into R, G, and B components. Three analog to digital converters would then be used to convert the signals into three parallel 8 bit streams of data, or 24 bits total. These 24 bits would then be routed to the address inputs of the lookup memory. The memory array would then produce three new streams of 8 bit R, G, and B data. Three digital to analog converters would convert these streams to three voltages representing the new R, G, and B values. A composite encoder would then return the image to the composite video form. Unfortunately, 24 bits of image data (8 bits each, R, G, and B) requires a LUT memory device of 48 Megabyte capacity. At this time, such a memory system is very expensive.

Digital video systems generally fall into two categories: component and composite. Component systems represent the image as three discreet data streams such as Red, Green, Blue (R, G, B). Composite systems represent the image using a single data stream, usually 8 bits wide, which is formed by passing the NTSC composite video signal through a single analog-to-digital converter without any prior decoding. In the NTSC video signal, color is presented by a 3.58 MHz amplitude and phase modulated subcarrier which is mixed with the luminance, or black and white portion of the image. In a composite digital video system, this subcarrier becomes part of the data stream. Color information in a composite digital system, is represented indirectly by the relationships between successive pixels, rather than explicitly as a proportion of R, G, and B values in the component digital video system.

Since there is only one data stream in the composite digital system, and color information is not directly accessible, applying the LUT concept would be of limited usefulness. A system could be constructed similar to a computer graphics system mentioned above, in which the 8 bit data stream could be connected to individual R, G, and B LUT memories. The outputs of these tables could be routed to respective red, green, and blue digital to analog converters. The resulting component analog video signals could then be fed to an NTSC composite encoder for viewing on a standard TV monitor. This would allow certain false color effects as well as contrast and brightness manipulation. However, the color information present in the original image is lost in the process. All effects would effectively be taking place on the luminance, or monochrome image. This system also requires considerable circuitry to convert and encode the composite video.

In the NTSC color television system, 4 fields are necessary in order to produce the desired color. Fields 1 and 2, each comprised of 262.5 lines, are interlaced, to produce one frame. Fields 3 and 4 are usually, if there is no movement, identical with fields 1 and 2, respectively, with the exception that the color reference subcarrier phase is reversed with respect to fields 1 and 2. It is desired to devise an inexpensive and simple system for creating special color changes and effects in, and utilizing, a four field, or multi-field color system, or other similar system, such as the PAL system.

It would be advantageous to devise a color lookup table system for color for providing color effects which could be used with a composite digital video system and produce a single composite digital data stream. Such a system would require no error-prone color encoders and decoders and only one analog to digital converter and one digital to analog converter, and would be simpler and less expensive.

It is therefore an object of this invention to provide a LUT circuit for producing color effects which will operate within the composite digital video domain, avoiding the necessity of decoding or encoding circuits to convert the signal to a component format to provide a less expensive and simpler method and apparatus for producing color effects on a composite video signal and that allows for versatile application to obtain numerous and interesting color effects. It is further an object to provide such a system that requires less memory and less processing times; it is further desired to have such a system capable of operating within a system, having internally computer generated sync signals.

Other objects and features of the invention and the manner in which the invention achieves its purpose will be appreciated from the following description and the accompanying drawings which exemplify the invention, it being understood that changes may be made in the specific method and apparatus disclosed herein without departing from the essentials of the invention set forth in the appended claims.

BRIEF SUMMARY OF THE INVENTION

The invention relates to a method for utilizing look-up tables to create special color effects without decoding to luminance and chrominance, in a composite video system having a digitized composite video signal to be modified, with said system capable of preserving or generating sync signals, wherein the digitized video signal has discrete values having the sampling frequency $Nf_s$ where N is an integer greater than 1, and $f_s$ is the color subcarrier frequency of the video input signal, with the method having the steps of storing in memory having addressable storage locations N sets of predetermined values such that the sets are addressable in a desired predetermined order, retrieving from memory the stored values at a rate $Nf_s$ and such that each of the N sets of values in memory is addressed in the predetermined order, and such that the digitized composite video signal is used to address the storage locations within each of the N sets to produce a digitized video output signal with different values, as desired. The values stored in the look-up table are created and stored by determining the amplitude values necessary at each of N successive points in equal periods of $1/Nf_s$ on a wave of one cycle of a color subcarrier of frequency $f_s$ such that when the values are sampled in the desired predetermined order at a rate $Nf_s$ and filtered, a full cycle of the color subcarrier having the phase and amplitude characteristics necessary to produce the desired color to be displayed for each group will result.

BRIEF DESCRIPTION OF THE DRAWINGS

FIG. 2 reflects the output signal voltage at 25 in FIG. 1 utilizing the look-up table values from Table 2.

FIG. 3 is the video composite signal voltage at 25 utilizing the look-up table data in Table 3.

DESCRIPTION OF THE PREFERRED EMBODIMENTS

Figure 1:
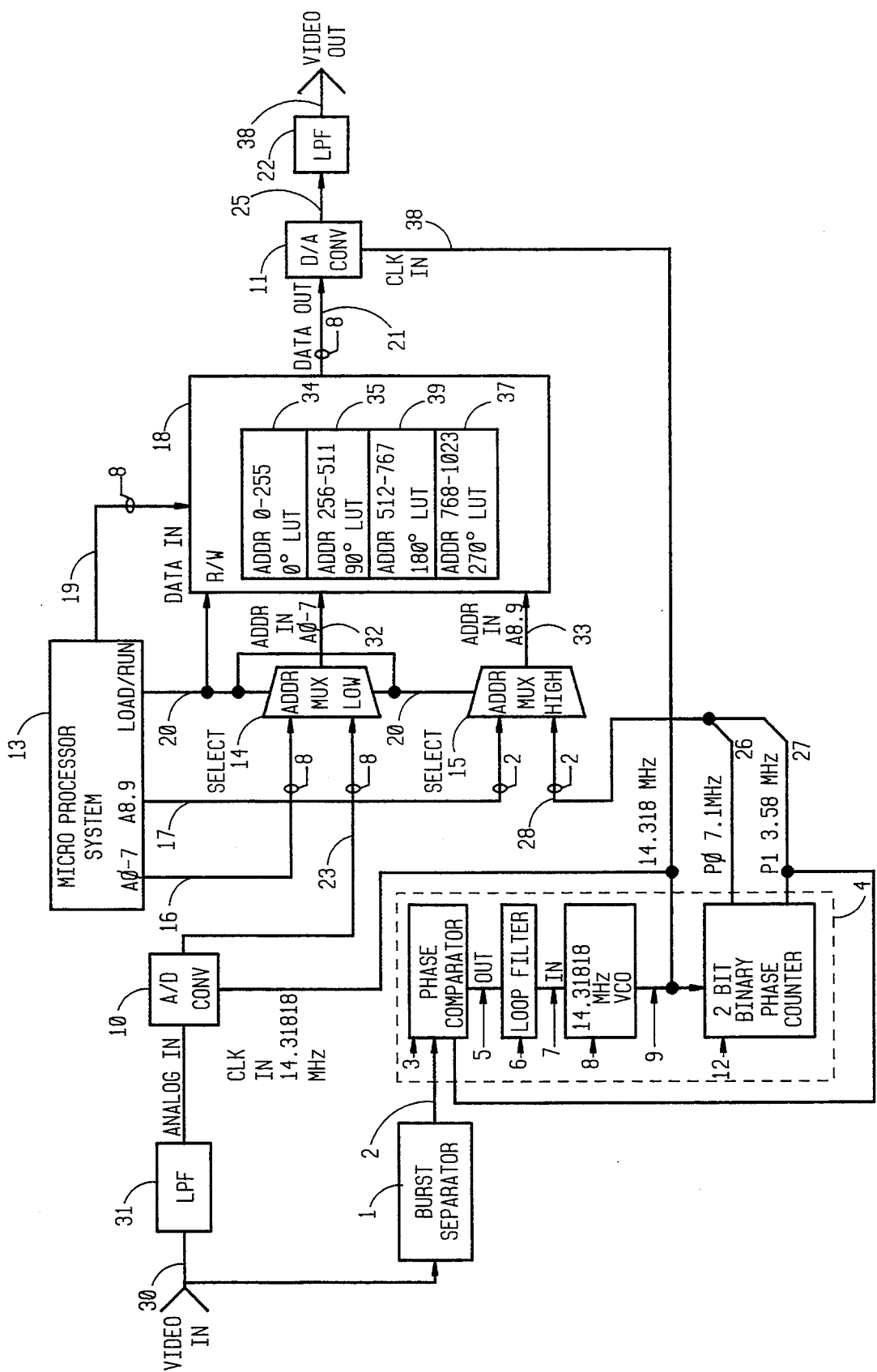
FIG. 1 is a block diagram of the invention. In this Figure, as in FIGS. 4 and 5, the buses are shown having a circle around the bus line with the number of wires in the bus indicated directly adjacent the circle.

The preferred method and apparatus is shown in FIG. 1. Incoming analog video at 30 is applied to the burst separator 1 which isolates and amplifies the colorburst portion of the NTSC waveform. Separated burst 2 is then applied to one of the two inputs of phase comparator 3 which is part of the colorburst phase locked loop circuit 4 (hereafter PLL). The phase error output signal from the phase detector 5 is conditioned for proper operation of the PLL by the loop filter 6. The filtered error voltage 7 is routed to the control voltage input of the nominal 14.31818 MHz voltage controlled oscillator 8 (hereafter VCO). This frequency is four times the frequency of the 3.58 MHz color subcarrier and is commonly used in composite digital video systems. In the preferred system, 14.31818 MHz will be the sample rate for the digitized video, and therefore the output 9 of the VCO is routed to the clock inputs of the analog to digital converter 10 and digital to analog converter 11. Consequently the system clock is responsive to the color subcarrier $f_s$ (3.58 MHz) of the video input signal. It is also routed to the 2 bit binary phase counter 12. This counter repeatedly counts from zero to three being incremented at a rate of 14.31818 MHz by the VCO. In a binary counter the least significant bit or bit 0 changes state or "toggles" at a rate equal to half the input signal. Similarly, the next least significant bit or bit 1 toggles at half the rate of bit 0. Therefore in the case of the phase counter 12, the least significant bit, P0 toggles at a frequency of 7.15909 MHz, and P1, the most significant bit, toggles at 3.579545 MHz, which is equal to the color subcarrier frequency. P1 is routed to the remaining input on the phase comparator 3 thus "closing the loop" such that the PLL acts to keep P1 in a constant phase relationship with the colorburst of the input video signal. Also, the 2 bit output of the phase counter now directly represents four unique phases of the color reference signal, each ninety degrees apart.

To perform effects, the lookup table values must be determined, one method of which is described hereafter, and the contents must be loaded by the microprocessor system unit 13 (hereafter MPU). The MPU is programmed to generate various look-up tables in a desired format as hereafter described to generate a particular special effect or color change desired. This microprocessor system can be an external computer such as several of the AMIGA brand personal computers currently available. The look-up table values could however be in any prestored format, such as a ROM (read only memory), either in the external computer or in place of the RAM 18.

Address multiplexers 14 and 15 allow the MPU's address signals at 16 and 17 to reach the address inputs of the lookup table memory, RAM 18. The bus 16 and bus 17, 8 bit and 2 bit buses respectively, are indicated in the Figure with the circle and line with the number eight and two respectively. The low address multiplexer 14 is connected to the least significant eight bits of RAM address via bus 32 and the high address multiplexer 15 is connected to the eighth and ninth address lines A8, A9 of the MPU 18 via 33, as the most significant bits. The purpose of muxes (short for multiplexers) 14 and 15 is to switch between the sources of addresses for the RAM. In this example, during the load mode indicated by Load/Run Control 20 when the Address Muxes 14 and 15 are connected to the MPU, the LUT is mapped from the MPU consecutively via the DATA bus 19 to the first 1024 memory locations in the RAM space 18. In FIG. 1, this is the only connection to the RAM's data inputs. Other memory addressing schemes are possible such that the LUT memory can be mapped to other address locations, or even accessed indirectly through a serial or parallel port. All that is necessary is that the MPU be able to write to all locations within the RAM and that the same locations be known and addressable for reading out during display. The load/run control bus 20 is connected to the two address muxes and the read/write (R/W) of the RAM 18, so that the load/run signal from the MPU determines whether the system, i.e., the Address Muxes 14 and 15, are in the load mode, where addresses and data from the MPU are passing to the RAM, or in the run mode, where addresses come from the A/D converter 10 via bus 23, and phase counter 12 via bus 28. This load/run signal then also independently controls the RAM's read/write mode via bus 24 so that the RAM contents are being written while the MPU is generating addresses through the muxes 14 and 15 to the memory via buses 32, 33 and data to the memory via bus 19. Here, the muxes are controlled via a common control line 20 that provides for both muxes 14, 15, to switch simultaneously between their two input ports, given a control signal.

In this manner, the 4 look-up tables shown in memory 18 for visual purposes only as 34, 35, 36, 37, can be addressed in any desired order by the MPU via bus 17, or consecutively via the phase counter 12, bus 28. The RAM is always outputting data, or reading, when the MPU is not in control, i.e., the addresses are generated via buses 32, 33 through the muxes 14 and 15 from the composite digitized signal coming from the A/D converter 10 and from the counter 12 via buses 23 and 28 respectively. Once the tables are properly written to the RAM by the MPU, the load/run line changes from load to run status. Now the low address multiplexer routes eight bits of data from the analog to digital converter 10 to the least significant eight address bits on the RAM 18 and the high address multiplexer routes the two bits from the phase counter 12 to address lines 26 and 27, these being the most significant address bits of the RAM 18. As discussed, the RAM (random access memory) could instead be a ROM with the necessary predetermined look-up tables in known addressable locations in the ROM.

The effect of connecting the two bits from the phase counter 12, P0 and P1 (26 and 27), to the high address line 33 is that one of the various memory banks of 256 locations is accessed during each of the four phases of one cycle of the 3.58 MHz color subcarrier signal. Thus:
  during phase 0, the 1st 256 locations are accessed, 34
  during phase 1, the 2nd 256 locations are accessed, 35,
  during phase 2, the 3rd 256 locations are accessed, 39, and,
  during phase 3, the 4th 256 locations are accessed, 37.

Thus, the LUT RAM is effectively divided into four 256 byte tables corresponding to 0, 90, 180, and 270 degrees of the color reference signal. Since the period of the 3.579545 MHz color subcarrier is approximately 280 nanoseconds, each table is used for about 70 nanoseconds before going on to the next table. The entire cycle of the four tables is completed in 280 nanoseconds, or at a rate of 3.579545 MHz.

Exactly which one of the 256 table entries is accessed in each table is determined by the eight bits of data from the A/D converter routed to the low eight address lines of the LUT RAM 18. This value represents the instantaneous voltage of the video signal at that particular instant. The darkest parts of the picture, represented by the lower voltage, would produce low 8 bit numbers and the lightest parts of the picture produce higher 8 bit numbers.

Figure 4:
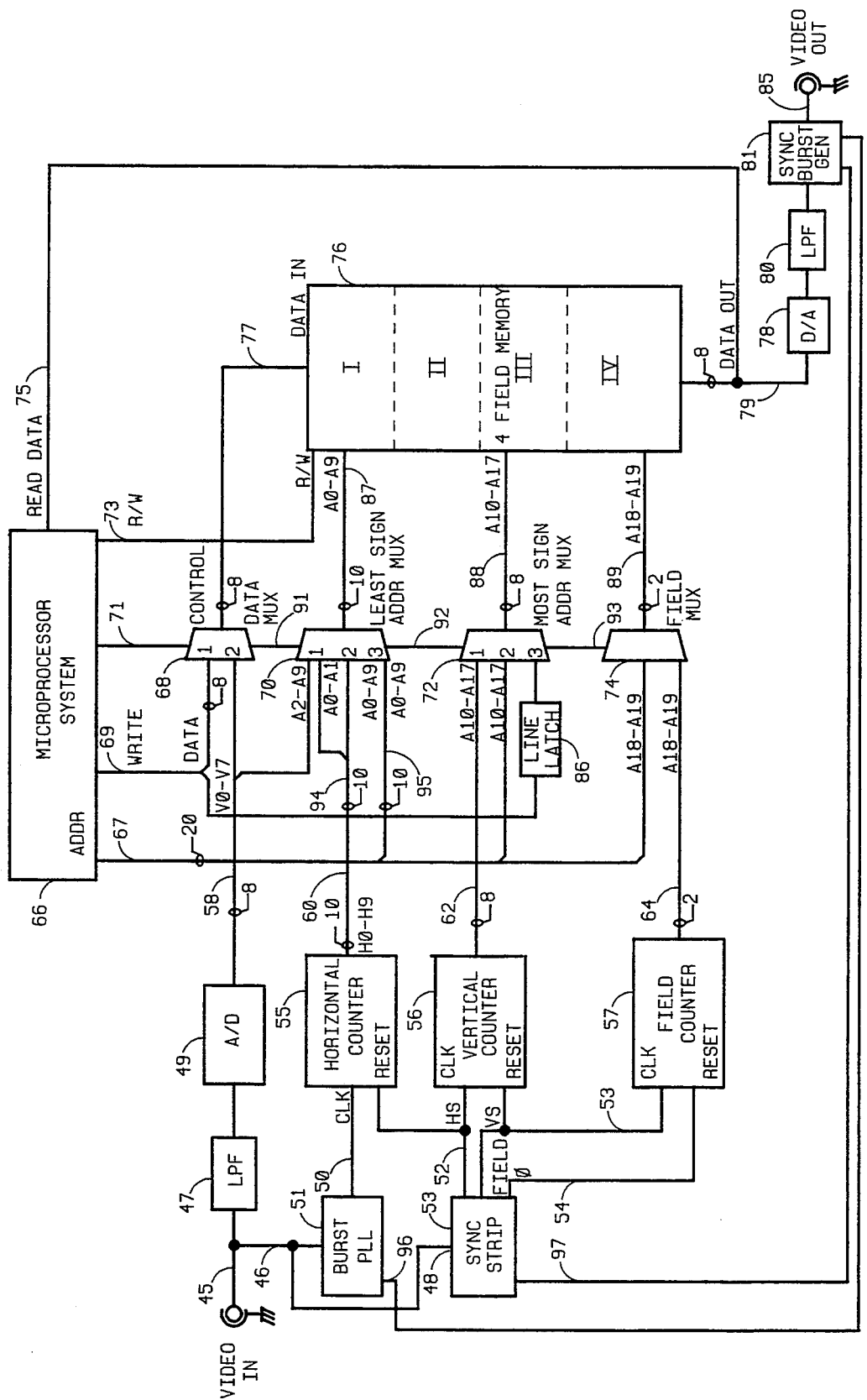
FIG. 4 is another mode of the invention shown taking advantage of and utilizing the four fields of the NTSC video composite signal.

The data resulting from the lookup operation appears as eight bits at the LUT RAM's data output port and is connected via bus 21 to a digital to analog converter 11 which converts the stream of numbers at the 14.31818 MHz rate of the system clock via 38, to a linear video signal where it is smoothed by the lowpass filter 22 before leaving the system. Sync signals, in this system, would be maintained and processed throughout the system although more than the 1024K RAM may be needed. Sync signals may also be stripped from the video signal at 30 and reinserted after readout from memory 18, as shown in FIG. 4, or the signals may be created by the MPU and stored in the memory 18, to be read out at the appropriate time as further discussed in relation to FIG. 5. Thus for every four digitized values, which values represent the 0 degree, 90 degree, 180 degree and 270 degree value of the 3.58 MHz color reference signal component of the new filtered analog composite video output signal at 36, a new color is produced.

Tables I and II in Appendix A show examples of values for look up tables used to generate an unaffected image and a negative image, respectively. In Table I the four tables contain identical data. The entry numbers represent the luminance of the signal 30, i.e., the 8 least significant bits 32. Each entry's value is exactly equal to the entry number or the entry's address. In this case, the stream of data leaving the LUT RAM is identical to the input stream. This table, then, has absolutely no effect on the video, and the resulting image is unaffected and identical to the video input.

In Table II, again the four tables each contain identical data, but this time the entry value is inversely related to the entry address. When this table is used, a negative image results. Any colors in the image will be complementary to the original color, because the color subcarrier is inverted along with the image itself.

Table III in Appendix B shows an example of solarization. The effect of this table is that all video levels above 127 become a solid shade of red, and all video levels less than or equal to 127 become cyan or greenish blue. FIG. 2 show the LUT results in the case that the video is consistently dark, or below code 128. Each dot on the graph represents the data from the table at the 0, 90, 180, and 270 degree points. These points are each separated in time by approximately 70 nanoseconds. The solid lines show an idealized version of the analog voltage from the D/A converter receiving this data. The dotted line shows the video waveform after the D/A voltage passes through the lowpass smoothing filter 22. Note that the 70 nanosecond "stairsteps" have been transformed by the filter into a sine wave with a period of 280 nanoseconds, or a frequency of 3.579545 MHz. This sine wave is interpreted by the NTSC receiver as a solid color. The saturation, or strength of the color is represented by the amplitude of this sine wave, the hue is represented by the phase of the sine wave, as referenced to the color burst signal at the beginning of each scan line.

The result then is a color modification responsive to the various amplitude levels, or brightness of the input video signal.

FIG. 3 shows what becomes of video levels above 127, again utilizing Table III. Another sine wave results, but the inverse of the waveform in FIG. 2 occurs. This phase shift of 180 degrees results in the color red, the complement of cyan in the NTSC system.

Usually, the resulting color is a mixture of the color present in the original image and the color generated in the lookup process. In the first example, from Table 1, the only color resulting would be that color that was present in the original image only. In the solarization example, the color resulting from the LUT process is so saturated due to the values chosen that it would obscure most or all of the original color from the input video.

The values in the look-up table and stored in memory are determined by determining the amplitude values at N points equally spaced in time at periods $1/Nf_s$, of the wave form (determined by the amplitude and phase) corresponding to the desired color that the particular NTSC or PAL system will produce. The wave forms necessary for each color are known and determinable in the NTSC or PAL system from information in commonly available video Engineering Manuals for both PAL and NTSC systems. It is necessary that N be an integer greater than 1, although 4 is the preferred value for N. Each group of N points is read into and stored in memory in a manner that allows them to be retrieved as a group in the same predetermined order that they appear on the wave form from which they were determined.

It should be understood that the address buses although shown as 8 bit buses for 8 bit bytes from the D/A converter 10 and elsewhere in FIG. 1, any X bit word and corresponding X bit address bus may be used, where X is an integer so long as it is sufficient to address the number of stored look-up table values, Nb, where b is at least the number of possible digitized values of the composite video input signal. In FIG. 1, the video signal is digitized into 256 discrete values, thus 256N or 1054 memory locations are necessary, requiring 8 bit address words, i.e. $2^x = 2^8 = 1054$.

In a digital composite video system containing a four field image memory, i.e., capable of also storing an image of the digitized video input signal, the LUT can be implemented using the existing four field memory array. FIG. 4 shows such a system. In this system, four fields of video may be stored in the one megabyte memory 76 and then continuously displayed as a frozen image. The fields are shown for visual purposes only as I, II, III and IV. It is also possible for the attached microprocessor unit 66 to modify the image in memory or store computer generated imagery into the four field memory, via address bus 67, read bus 75, and data bus 71. As discussed hereafter, there buses are switched via one or more of the muxes 68, 70, 72, 74 depending on which mode is desired. The computer generated imagery capability is used in the LUT system when the microprocessor 66 stores the lookup table data in the image memory 76. The system is then placed in the LUT mode to readout from memory whereby special color effects can be created using the digitized video input signal as addresses to the RAM 76. In this case the image memory no longer contains a stored image. Instead it contains data specifically created to produce special effects when the system is configured to operate in the LUT mode.

In this system, the composite video input signal 45 in FIG. 4 enters via 46 a colorburst PLL 51 as in 1 and 4 in FIG. 1. This PLL circuit strips the colorburst and uses it to generate a 14.31818 MHz system clock signal 50 which is synchronized to the colorburst portion of the input video signal. The video signal is also fed via 48 to the sync stripper 53 which separates the vertical and horizontal sync pulses (VS and HS, respectively) from the video signal as well as an even/odd field signal 54 which is fed to the field counter 57 via 54.

The colorburst and other sync signals are also fed via 96 and 97 to the sync and burst generator 81 to be combined with the analog video output signal to create the analog composite video output signals at 85.

The 14.31818 MHz master clock is used via 50 to increment the horizontal counter approximately every seventy nanoseconds. This counter is reset by the horizontal sync signal HS via 52 at the start of each horizontal scan line. The horizontal sync signal is also routed to the clock input of the vertical counter 56. The vertical counter is reset by the vertical sync pulse VS at the start of each field. The vertical sync pulse is also routed to the clock input of the two bit field counter 57. The even/odd field signal resets the least significant bit of the field counter 57 every two fields.

The parallel outputs of all these counters from a twenty bit address (50, 62, 64) which is routed to the memory array addresses 87, 88, 89 via the muxes 70,72,74. The counters 55, 56, 57 effectively scan through the one megabyte memory 76 fifteen times a second. The least significant addresses of the memory 76 are A0–A9 (87), the next least are A10–A17 (88), the most significant are A18–A19 (89).

The composite video input passes through a low pass antialiasing filter 47 and into the analog to digital converter 49. The converter is clocked at 14.31818, MHz via 50. The output of the A/D converter then is a stream of eight bit word samples at 58, each 8 bit word V0–V7 being seventy nanoseconds in duration. In normal "framegrabbing" operation, this data stream is routed to the image memory data input 77 via the 8 bit bus 58 and data mux 68 (input 2). The mux 68 is controlled by instructions from the MPU 66 via control bus 71.

The data outputs of the memory are attached via 8 bit bus 79 to a digital to analog converter 78 which is also clocked at 14.31818 MHz (system clock). The analog output then is routed to the low pass smoothing filter 80 where it is combined with sync and burst signals via the sync and burst generator 81, to create the video out signal 85. The sync and burst generator acquires the sync and burst signals from the sync stripper 53 and Burst PLL 51, although these signals could be synthesized from the MPU (computer) via software by writing into appropriate RAM (76) memory locations the necessary digitized sync signals then reading the same out of memory at the appropriate time in relation to the video picture portion such that a composite video analog output signal is produced at 85.

As indicated, addresses and data are not directly connected to the memory array 76, but rather pass through multiplexers 68, 70, 72, 74 which allow the microprocessor to select from multiple sources of address and data signals via control bus 71, which bus is connected to all muxes 68, 70, 72, 74 and controls them independently of each other. The Data Multiplexer (Data MUX) 68 can select either A/D data via 58 (input 2 of mux 68) for frame capture, or microprocessor data via 8 bit bus 69 for modifying or synthetically generating image data, including LUT tables (input 1 of mux 68).

The Least Significant Address Multiplexer 70 selects the horizontal counter 55 via 94 to address input port 2 for addressing A0–A9 of the RAM 76, during frame grabbing or continuous display, in order to consecutively count through the bytes stored in memory 76.

For microprocessor 66 access to the memory 76 the 10 least significant microprocessor address lines of bus 67 are routed to the memory 76 via 95 through the Least Significant Address MUX 70, input port 3, allowing processor access for modifying or synthetically generating image data, including LUT tables.

Additionally, the eight A/D data lines 58 are routed to the eight most significant address lines (A2-A9) of input port 1 of mux 70. The two least significant bits are connected to the two least significant bits, H0, H1, of the 10 bit output H0-H10 of the horizontal counter 55. This is the key to using the frame memory as a color lookup table. When video data V0-V7 is routed through the multiplexer 70 to the memory address bus 87, the system functions in a manner similar to that in FIG. 1 (with some important differences described later) to create color effects responsive to the amplitude of the video input signal. The vertical counter 56 is connected to addresses A10-A17 of RAM 76 via input port 1 of mux 72 and bus 88 and the field counter is connected to input port 2 of mux 74, during normal LUT mode, to maintain the desired line and field sequence for each frame of the video.

As discussed, in the LUT mode, when input port 1 of mux 70 is selected, A0 and A1 are connected to the two least significant bits (H0-H1) of the horizontal counter 55. This connection, in combination with the action of the field counter 57, assures that proper color phase is maintained. Thus, for a given line number, determined by the source feeding the Most Significant Address mux 72, four unique lookup tables are accessed in each field, due to the two least significant address bits acting similarly to the phase counter in 12 in FIG. 1. Due to the action of the field counter 57, different areas of memory 76 are accessed during each of four fields. These 4 areas are shown in FIG. 4 as I, II, III, IV for illustration only, since the physical location of the addresses for values for each field may vary as desired. Without this field counting, proper color phase would not be achieved due to the fact that the color subcarrier reverses phase on alternate frames. The Field Multiplexer 74 is provided for microprocessor 66 access of the address bus 89 for reading and writing by the microprocessor to the field locations in the RAM 76, through input 1.

Thus, for a given line number (via address lines A10-A17), total memory may be thought of as being divided into sixteen lookup tables (four tables, 0 degrees, 90 degrees, 180 degrees, 270 degrees from each of the four fields). Each table has 256 bytes.

The MPU can control the Most Significant Address Multiplexer 72 to select port 2 to address the next 8 most significant (beyond the 10 least significant address lines that are connected to 95) address lines 91 of the MPU 66 address bus 67, for reading or writing to or from the image memory 76 by the MPU. (The two most significant address lines of bus 67 are connected to input port 1 of mux 74). The vertical counter output is routed via bus 62 to the memory addresses A10-A17 through input 2 of multiplexer 72, which is particularly useful for frame capture or frame display. Alternatively, an eight bit line latch 86 can be selected (input 3 of mux 72) having the effect of forcing the line number of the RAM 66 (address bits A10-A17) to a specific value determined by the microprocessor via Write Data bus 69. In the mode shown, when the line latch is selected, memory address lines A10-A17 no longer indicate the line number in the field, but instead "freeze" the line number; it can then be thought of as a pointer to one of the 256 unique sets of lookup tables corresponding to one of the 256 lines in the field. Within any given line there are 4 tables (0 degrees, 90 degrees, 180 degrees, 270 degrees) each having 256 values; consequently, since there are 4 fields, each of the 256 unique sets of lookup tables has each set comprised of sixteen 256 byte tables. Some or all of these sets may be programmed in advance by the microprocessor. To switch to a new set, the microprocessor sends a new eight bit word to the line latch 86. This allows changing color effects nearly instantly, rather than having to read into memory an entire new LUT.

Many unique effects are possible by stepping through different tables quickly. For example, the microprocessor could increment the line latch after each four field sequence. Since each four field sequence is accomplished in 1/15 of a second, it would take approximately seventeen seconds to complete this effect using each of 256 lines. Each successive field would be processed with a different set of LUT data, creating a visual display that changes the effects continuously throughout the seventeen second period, rather than displaying just one color effect change responsive to one LUT.

It is also possible to select the vertical counter 56 when in the LUT mode. The "tables" for each line can be programmed by the microprocessor to be slightly different throughout the screen. The effect is that each line in the image is processed with its own unique set of tables. This makes possible a number of new effects, such as emulating a commonly used dark sky filter used in conventional film photography. To do this, the microprocessor would program the top line's LUT to lower the brightness of the image, and, perhaps give it a brownish tint. Each successive line below would be programmed to have less and less effect on the image, until at the bottom of the screen, the image would be unmodified.

Of course, due to the manner which arbitrary lookup functions can be created, a nearly infinite number of other effects are possible.

It is possible to construct a four field memory system (or 8 field in the PAL format) in which the horizontal sync, blanking and color burst signals are stored for each line along with the picture information. One manner in which this can be done is by programming these signals from the micro processor (computer). The analog sync values can be obtained from standard video engineering manuals based on the particular system, PAL or NTSC, and the digitized equivalent then determined. These digitized values are then stored in each line of memory 76 at the proper memory locations following the last video pixel information so that following the last pixel information stored for each respective horizontal line, the sync signals, including horizontal, vertical and other sync signals for a given line and frame that are necessary to display the desired video picture, are read out at the proper horizontal clock count. This eliminates the need for a separate sync generator, resulting in a simpler and more economical system. Using the LUT in the previous manner described to store the LUT information in memory would erase the sync, burst and blanking information in memory so that the system would again require a separate sync generator, resulting in additional parts. To allow the invention to be used with a programmed and stored sync system requires modifications to resolve this memory conflict.

Figure 5:
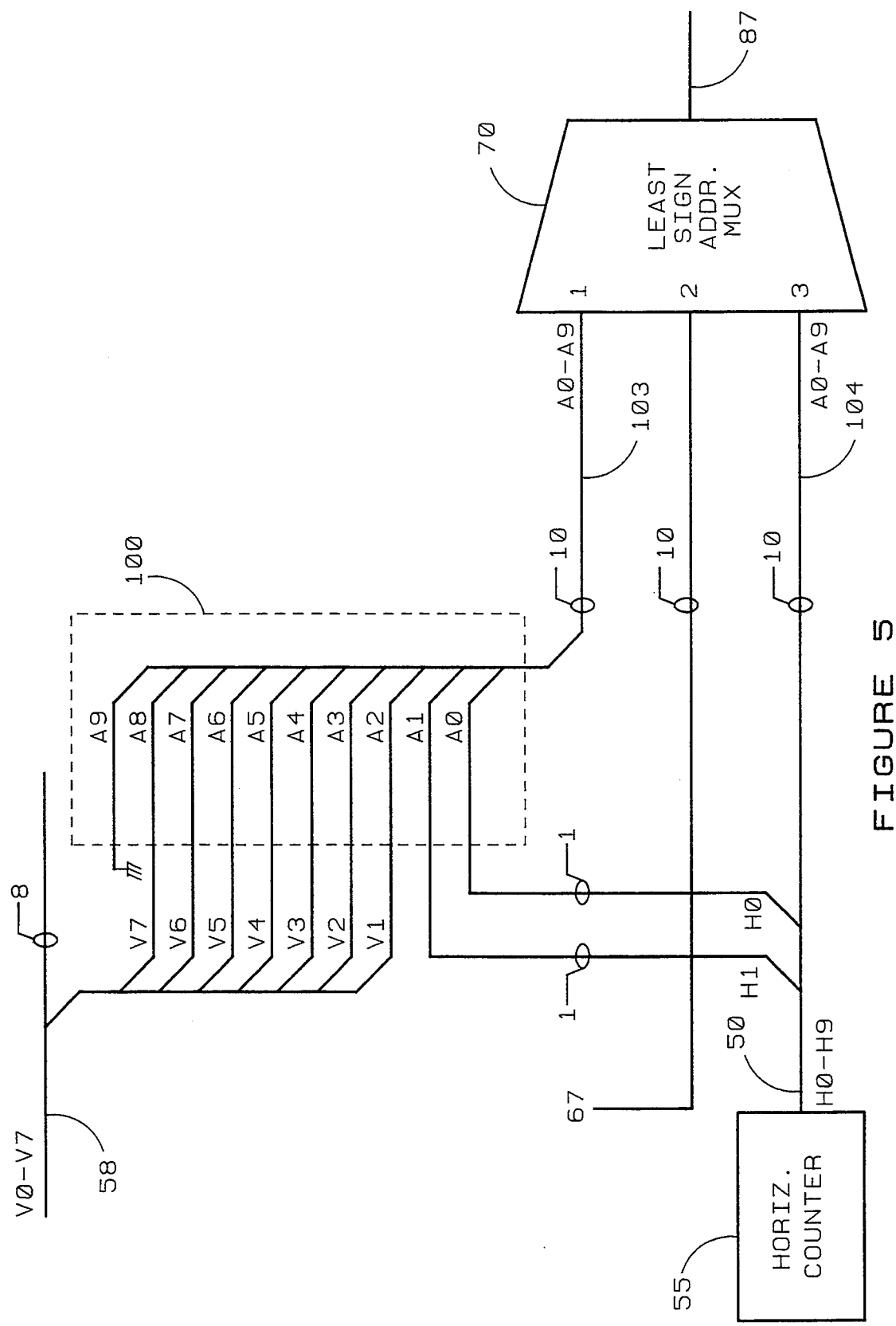
FIG. 5 is a variation of the Least Significant Address MUX circuit shown in FIG. 4 that allows for computer generated sync signals to share the memory with the look-up table.

To achieve this, the connections to the mux 70 in FIG. 4 are modified as shown in FIG. 5. Only the seven most significant bits V1–V7 from the A/D converter are sent to the Least Significant Address Multiplexer 70. Bit zero, V0, is left unconnected. Consequently, bits one through seven are respectively connected through the multiplexer to address lines two through eight. The ninth address line A9 is forced to zero, i.e. grounded.

With this arrangement, only the first 512 memory locations of each line in the four field memory can be accessed using the LUT mode. Memory use is arranged such that the sync, blanking and burst are stored in the upper half of memory (i.e., in some or all of the other 512 memory locations of the 1024 bit RAM). Therefore, LUT data does not interfere with the storage of sync, blanking and burst information. The drawback is that only seven bits of A/D data are used, resulting in a slightly worse signal to noise ratio for the resulting video signal.

When creating data for the tables, in this mode, the microprocessor (MPU) program generating the tables adjusts the table data to compensate for the fact that samples from the A/D converter are essentially scaled down by a factor of two due to dropping the least significant bit and shifting the remaining bits toward the least significant bit.

The Least Significant Address Multiplexer 70 is switched to select the A/D converter data via bus 58 only during the time that the picture is being displayed. During the sync, blanking and burst times, the horizontal counter output H0–H9 is routed via bus 94 to the memory 76 via the mux 70 in order to scan the sync, blanking and burst data. The sync data when read out of memory 76 via bus 79, is then converted to analog form with the video picture information and filtered to create the composite video signal 85.

It should be understood that color changes as used herein also refer to variations in luninance i.e., grey levels.

While there have been shown and described particular embodiments of the invention, it will be obvious to those skilled in the art that changes and modifications may be made without departing from the invention or its equivalent and, therefore, it is intended by the appended claims to cover all such changes and modifications as fall within the true spirit and scope of the invention.

TABLE I

| ENTRY # | UNAFFECTED IMAGE | | | |
|---|---|---|---|---|
| | 0° LUT | 90° LUT | 180° LUT | 270° LUT |
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| . | . | . | . | . |
| . | . | . | . | . |
| 253 | 253 | 253 | 253 | 253 |
| 254 | 254 | 254 | 254 | 254 |
| 255 | 255 | 255 | 255 | 255 |

TABLE II

| ENTRY # | NEGATIVE IMAGE | | | |
|---|---|---|---|---|
| | 0° LUT | 90° LUT | 180° LUT | 270° LUT |
| 0 | 255 | 255 | 255 | 255 |
| 1 | 254 | 254 | 254 | 254 |

TABLE II-continued

| ENTRY # | NEGATIVE IMAGE | | | |
|---|---|---|---|---|
| | 0° LUT | 90° LUT | 180° LUT | 270° LUT |
| 2 | 253 | 253 | 253 | 253 |
| 3 | 252 | 252 | 252 | 252 |
| . | . | . | . | . |
| . | . | . | . | . |
| 253 | 2 | 2 | 2 | 2 |
| 254 | 1 | 1 | 1 | 1 |
| 255 | 0 | 0 | 0 | 0 |

TABLE III

| ENTRY # | SOLARIZATION | | | | |
|---|---|---|---|---|---|
| | 0° | 90° | 180° | 270° | |
| 0 | 127 | 255 | 127 | 63 | ⎫ |
| 1 | 127 | 255 | 127 | 63 | ⎬ |
| 2 | 127 | 255 | 127 | 63 | ⎬ CYAN |
| . | . | . | . | . | |
| . | . | . | . | . | |
| 127 | 127 | 255 | 127 | 63 | ⎭ |
| 128 | 127 | 63 | 127 | 255 | ⎫ |
| 129 | 127 | 63 | 127 | 255 | ⎬ |
| 130 | 127 | 63 | 127 | 255 | ⎬ RED |
| . | . | . | . | . | |
| . | . | . | . | . | |
| 255 | 127 | 63 | 127 | 255 | ⎭ |
| 256 | 127 | 63 | 127 | 255 | |

What is claimed is:

1. A method for utilizing look-up tables to create special color effects without decoding to luminance and chrominance, in a composite video system having a digitized composite video signal to be modified, wherein said digitized video signal has discrete values having a sampling frequency $Nf_s$ where N is an integer greater than 1, and $f_s$ is the color subcarrier frequency of the video input signal, said method having the steps:

a. Storing in memory having addressable storage locations N sets of predetermined values such that the sets are addressable in a desired predetermined order;

b. Retrieving from memory the stored values at a rate $Nf_s$ and such that each of the N sets of values in memory is addressed in the predetermined order, and such that the digitized composite video signal is used to address the storage locations within each of the N sets, to produce a digitized video output signal with different values as desired.

2. A method for utilizing look-up tables to create special color effects without decoding to luminance and chrominance, in a composite video system having a digitized composite video signal to be modified and said system capable of preserving or generating sync signals for later combination with the modified video signal, wherein said digitized video signal has discrete values having a sampling frequency $Nf_s$ where N is an integer greater than 1, and $f_s$ is the color subcarrier frequency of the video input signal, said method having the steps:

a. Storing in memory having addressable storage locations N sets of up to b values, where b is the number of possible discrete values of the digitized video input signal, such that any group of N values, one from each of the N sets, when accessed at the rate $Nf_s$ in a desired predetermined order and filtered, will produce one cycle of the color subcarrier frequency having the characteristics to produce a desired color;

b. Retrieving from memory the stored values at a rate $Nf_s$, and such that each of the N sets of data in the memory is addressed in a predetermined order, and the digitized composite video signal is used to address the storage locations within each of the N sets, to produce a digitized output signal having the same sampling rate as the digitized video input but with different values as desired.

3. A method for utilizing look-up tables to create special color effects without decoding to luminance and chrominance, in a composite video system having a digitized composite video signal to be modified and said system capable of preserving or generating sync signals for later combination with the modified video signal, wherein said digitized video signal has discrete values having a sampling frequency $Nf_s$ where N is an integer greater than 1, and $f_s$ is the color subcarrier frequency of the video input signal, said method having the steps:

a. Storing in memory having addressable storage locations N sets of up to b values where b is equal to the number of possible discrete values of the digitized video input signal, and where one value from each of the N sets is related to a specified value from each of the other sets to create b groups of N related values, where each group of N values represents successive values at N different points in time at equal periods of $1/Nf_s$ in one complete cycle of the color subcarrier;

b. Retrieving from memory the stored values at a rate $Nf_s$ and such that each of the N sets of values in memory is addressed in the predetermined order and using the digitized video input signal as addresses to the memory, to produce a digitized output signal having the same sampling rate as the digitized video input signal but with different values as desired.

4. A method for utilizing look-up tables to create special color effects without decoding to luminance and chrominance, in a composite video system having a digitized composite video signal to be modified and said system capable of preserving or generating sync signals for later combination with the modified video signal, wherein said digitized video signal has discrete values having a sampling frequency $Nf_s$ where N is an integer greater than 1, and $f_s$ is the color subcarrier frequency of the video input signal, said method having the steps:

a. Creating one or more groups of N values to be stored and retrieved from memory, one group for each color to be displayed, by determining the amplitude values necessary at each of N successive points in equal periods of $1/Nf_s$ on a wave of one cycle of a color subcarrier of frequency $f_s$ such that when the values are sampled in the desired predetermined order at a rate $Nf_s$ and filtered, a full cycle of the color subcarrier having the phase and amplitude characteristics necessary to produce the desired color to be displayed for each group will result;

b. Storing in memory the groups of N values in various locations in memory so that each group of N values will be retrievable in response to a selected level of the amplitude of the composite video input signal, and such that the N values in each group will be retrievable in the predetermined order necessary to produce the desired color;

c. Retrieving from memory the stored values in response to the composite video input signal, such that for desired levels of the video input signal, the group stored corresponding to said level will be retrieved, and so that the N values in each group so retrieved will be retrieved in the predetermined order, to produce a digitized video output signal responsive to the video input signal but with different values as desired.

5. The method in claims 1, 2 or 3, wherein the values stored to achieve the desired color are determined by calculating the amplitude values necessary at each of N successive points on a wave of a cycle of a color subcarrier at frequency $f_s$ such that when the values are sampled in the predetermined order at a rate $Nf_s$ and filtered a full cycle of the color subcarrier having the phase and amplitude characteristics necessary to produce the desired color will result.

6. The method in claim 5 wherein $N=4$.

7. The methods in claims 1, 2, 3 or 4 where $N=4$.

8. Apparatus for utilizing look-up tables to create special color effects without decoding to luminance and chrominance, in a composite video system having a digitized composite video signal to be modified, wherein said digitized video signal has discrete values having a sampling frequency $Nf_s$ where N is an integer greater than 1, and $f_s$ is the color subcarrier frequency of the video input signal, said apparatus comprised of:

a. Memory means having addressable storage locations;

b. Means for storing in said memory means N sets of predetermined values such that the sets are addressable in a desired predetermined order;

c. Means for retrieving from said memory means the stored values at a rate $Nf_s$ and such that each of the N sets of values in memory is addressed in the predetermined order, and such that the digitized composite video signal is used to address the storage locations within each of the N sets, to produce a digitized video output signal with different values as desired.

9. Apparatus for utilizing look-up tables to create special color effects without decoding to luminance and chrominance, in a composite video system having a digitized composite video signal to be modified, wherein said digitized video signal has discrete values having a sampling frequency $Nf_s$ where N is an integer greater than 1, and $f_s$ is the color subcarrier frequency of the video input signal, said apparatus comprised of:

a. Memory means having addressable storage locations;

b. Means for storing in said memory means N sets of up to b values, where b is the number of possible discrete values of the digitized video input signal, such that any group of N values, one from each of the N sets, when accessed at the rate $Nf_s$ in a desired predetermined order and filtered, will produce one cycle of the color subcarrier frequency having the characteristics to produce a desired color;

c. Means for retrieving from said memory means the stored values a rate $Nf_s$ and such that each of the N sets of data in the memory is addressed in a predetermiend order, and the digitized composite video signal is used to address the storage locations within each of the N sets, to produce a digitized output signal having the same sampling rate as the digitized video input but with different values as desired.

10. Apparatus for utilizing look-up tables to create special color effects without decoding to luminance and chrominance, in a composite video system having a digitized composite video signal to be modified, wherein said digitized video signal has discrete values having a sampling frequency $Nf_s$ where N is an integer greater than 1, and $f_s$ is the color subcarrier frequency of the video input signal, said apparatus comprised of:

a. Memory means having addressable storage locations;
 b. Means for storing in said memory means N sets of up to b values where b is equal to the number of possible discrete values of the digitized video input signal, and where one value from each of the N sets is related to a specified value from each of the other sets to create b groups of N related values, where each group of N values represents successive values at N different points in time at equal periods of $1/Nf_s$ in one complete cycle of the color subcarrier;
 c. Means for retrieving from said memory means the stored values at a rate $Nf_s$ and such that each of the N sets of values in memory is addressed in the predetermined order and using the digitized video input signal as addresses to the memory, to produce a digitized output signal having the same sampling rate as the digitized video input signal but with different values as desired.

11. The apparatus in claims 1, 9 or 10 having means for determining values to be stored by calculating the amplitude values necessary at each of N successive points on a wave of a cycle of a color subcarrier at frequency $f_s$ such that when the values are sampled in the predetermined order at a rate $Nf_s$ and filtered a full cycle of the color subcarrier having the phase and amplitude characteristics necessary to produce the desired color will result.

12. The method in claim 11 wherein N=4.

13. Apparatus for utilizing look-up tables to create special color effects without decoding to luminance and chrominance, in a composite video system having a digitized composite video signal to be modified, wherein said digitized video signal has discrete values having a sampling frequency $Nf_s$ where N is an integer greater than 1, and $f_s$ is the color subcarrier frequency of the video input signal, said apparatus comprised of:

a. Memory means having addressable storage locations;
 b. Means for creating one or more groups of N values to be stored in and retrieved from said memory means, one group for each color to be displayed, by determining the amplitude values necessary at each of N successive points in equal periods of $1/Nf_s$ of a wave of one cycle of a color subcarrier of frequency $f_s$ such that when the values are accessed in the desired predetermined order at a rate $Nf_s$ and filtered, a full cycle of the color subcarrier having the phase and amplitude characteristics necessary to produce the desired color to be displayed for each group will result;
 c. Means for storing in memory the groups of N values in various locations in memory so that each group of N values will be retrievable in response to a selected level of the amplitude of the composite video input signal, and such that the N values in each group will be retrievable in the predetermined order necessary to produce the desired color;
 d. Means for retrieving from said memory means the stored values in response to the composite video input signal, such that for desired levels of the video input signal, the group stored corresponding to said level will be retrieved, and so that the N values in each group so retrieved will be retrieved in the predetermined order, to produce a digitized video output signal responsive to the video input signal but with different values as desired.

14. The apparatus in claims 9, 10, 11 or 12 where N=4.

* * * * *